United States Patent
Kojima

[11] Patent Number: 6,081,332
[45] Date of Patent: Jun. 27, 2000

[54] MONOCHROMATOR

[75] Inventor: Manabu Kojima, Tokyo, Japan

[73] Assignee: Ando Electric Co., Ltd., Tokyo, Japan

[21] Appl. No.: 09/217,842

[22] Filed: Dec. 22, 1998

[30] Foreign Application Priority Data

Dec. 24, 1997 [JP] Japan ................................. 9-355818

[51] Int. Cl.⁷ ............................................... G01J 3/18
[52] U.S. Cl. ............................................................ 356/334
[58] Field of Search ..................... 356/326, 328, 356/330–334

[56] References Cited

U.S. PATENT DOCUMENTS

| | | |
|---|---|---|
| 3,563,656 | 2/1971 | Helms . |
| 3,600,093 | 8/1971 | McMahon . |
| 4,455,087 | 6/1984 | Allemand et al. . |
| 4,673,292 | 6/1987 | Pouey . |
| 5,329,353 | 7/1994 | Ichimura et al. . |

FOREIGN PATENT DOCUMENTS

| | | |
|---|---|---|
| 196 11 218 A1 | 3/1996 | Germany . |
| 196 39 939 A1 | 9/1996 | Germany . |

*Primary Examiner*—K. P. Hantis
*Attorney, Agent, or Firm*—Finnegan, Henderson, Farabow, Garrett & Dunner, L.L.P.

[57] ABSTRACT

A monochromator including an incident portion upon which light to be measured is made incident; a first lens for converting the incident light to be measured into parallel rays of light; a diffraction grating for receiving the light to be measured converted into the parallel rays of light and for outputting the light at an angle which differs depending on wavelength; a second lens for condensing the output light outputted from the diffraction grating at a certain angle; an output portion for outputting the output light thus condensed; and an angle changing device for making variable at least a relative angle between the diffraction grating and the second lens by one of rotation of the diffraction grating and movement of arrangement of the first and second lenses centering around the diffraction grating.

4 Claims, 3 Drawing Sheets

MONOCHROMATOR

BACKGROUND OF THE INVENTION

1. Field of the Invention

The present invention relates to a monochromator.

2. Description of the Related Art

As a conventional monochromator to be referred to, a structure in a case where a lens is used in a monochromator of Littrow type is shown in FIGS. 5 and 6. FIG. 5 is a top view of the monochromator, and FIG. 6 is an explanatory diagram in which the structure of this monochromator is developed from left to right along the optical path, and the z-axis indicates the height direction. In these drawings, P1 designates an optical fiber; P11, a lens; P5, a diffraction grating; and P9, an output slit.

As shown in FIG. 6, since the height of the output slit P9 differs from the height of the optical fiber P1, the center line of the output light from the optical fiber P1 differs from the center line of the lens P11.

The output light from the optical fiber P1 is transmitted through the lens P11 on the lower side (or upper side) of its center and becomes parallel, and is incident upon the diffraction grating P5. The center line of the output light before it is transmitted through the lens is not aligned with the center line of the transmitted light, and the light is bent.

The transmitted light incident upon the diffraction grating P5 is reflected at a different angle according to the wavelength, and this reflected light is transmitted again through the lens P11 on the upper side (or lower side) of its center and is condensed. Then, the condensed light is emitted from the output slit P9.

With such a structure, it is possible to extract only a particular wavelength component from the output slit P9. In addition, the particular wavelength which is extracted can be changed by rotating the diffraction grating PS.

However, with the structure in which the lens is used in the conventional monochromator of Littrow type, since the center line of the incident light upon the lens P11 and the center line of the output light therefrom is offset from the center line of the lens P11, aberrations occur. For this reason, the resolving power deteriorates, and the dynamic range of the light to be measured becomes narrow, resulting in a decline in the characteristics of the monochromator.

Further, the resolving power RB in the entire monochromator including the diffraction grating P5 can be approximately expressed by the following formula:

$$RB = 2d/(m \cdot f) \cdot S \cdot \cos \beta \qquad (1)$$

where d is the groove spacing of the diffraction grating P5, m is the order of diffraction of the diffraction grating P5, f is the focal length of the lens, S is the slit width of the output slit P9, and $\beta$ is the angle formed by the reflected light from the diffraction grating P5 and the normal to the diffraction grating P5.

In the layout of the Littrow type, however, since the reflected light from the diffraction grating P5 is at the same angle as the incident light as shown in FIG. 7, the angle $\beta$ between the reflected light from the diffraction grating P5 and the normal to the diffraction grating P5 cannot be set to a value more than the angle of rotation of the diffraction grating P5. For this reason, as is apparent from the formula (1), the angle $\beta$ becomes small, so that it is theoretically difficult to expect a high resolving power. Here, the angle of rotation of the diffraction grating P5 is the angle which is formed by, on one hand, a bisector of the incident optical axis and the reflective optical axis of the diffraction grating P5 and, on the other hand, the normal to the diffraction grating P5, and assumes a predetermined angle according to the wavelength.

SUMMARY OF THE INVENTION

Accordingly, it is an object of the present invention to provide a monochromator which has a high resolving power, a wide dynamic range of the light to be measured, and a high characteristic concerning the measurement accuracy.

To this end, according to a first aspect of the present invention, there is provided a monochromator comprising: an incident portion upon which light to be measured is made incident; a first optical system for converting the incident light to be measured into parallel rays of light; spectral diffraction means for receiving the light to be measured converted into the parallel rays of light and for outputting the light at an angle which differs depending on wavelength; a second optical system for condensing the output light outputted from the spectral diffraction means at a certain angle; an output portion for outputting the output light thus condensed; and angle changing means for making variable at least a relative angle between the spectral diffraction means and the second optical system by one of rotation of the spectral diffraction means and movement of arrangement of the first and second optical systems centering around the spectral diffraction means.

According to the above-described first aspect of the invention, the light to be measured incident from the incident portion is converted into parallel rays of light by the first optical system and is projected onto the spectral diffraction means. Then, light is outputted by the spectral diffraction means at an angle which differs depending on the wavelength, and the output light outputted at a certain angle is condensed by the second optical system and is outputted. Accordingly, the light outputted from the output portion is spectrally separated into a wavelength component of the light to be measured. Further, by changing the angle of the output light from the spectral diffraction means to be condensed with the angle changing means, the wavelength of the light outputted from the output portion is changed.

Furthermore, since the angle of incidence of the light projected onto the spectral diffraction means is not equal to the output angle of the output light from the spectral diffraction means to be condensed unlike the conventional monochromator of Littrow type, the optical path from the input portion to the spectral diffraction means and the optical path from the spectral diffraction means to the output portion are independently controllable, respectively. Hence, the restrictions imposed on the conventional monochromator of Littrow type can be obviated. Accordingly, as the first optical system for converting the light into parallel rays of light and the second optical system for condensing the light at a particular angle, it is possible to select the optical systems under free conditions. As a result, it is possible to avoid a decline in resolving power which has occurred in the optical systems and to improve the resolving power of the entire apparatus.

In addition, since the output angle of the light which is outputted from the spectral diffraction means and is subsequently condensed and the angle of incidence of the light which is projected onto the spectral diffraction means are not identical and they are selectable, it is also possible to improve the resolving power of the spectral diffraction means.

Further, according to a second aspect of the present invention, there is provided a monochromator comprising: an incident portion upon which light to be measured is made incident; a first optical system for converting the incident light to be measured into parallel rays of light; spectral diffraction means for receiving the light to be measured converted into the parallel rays of light and for outputting the light at an angle which differs depending on wavelength; a second optical system for condensing the output light outputted from the spectral diffraction means at a certain angle; an output portion for outputting the output light thus condensed; and rotating means for rotating the spectral diffraction means so as to change the wavelength of the output light outputted from the output portion.

According to the above-described second aspect of the invention, in addition to the advantages similar to those of the first aspect of the invention, since the variable arrangement in the monochromator is constituted by the spectral diffraction means alone, a decline in mechanical accuracy can be minimized, and stable measurement accuracy can be realized.

DETAILED DESCRIPTION OF THE PREFERRED EMBODIMENT

Referring now to FIGS. 1 to 4, a description will be given of an embodiment of the present invention.

Figure 1:
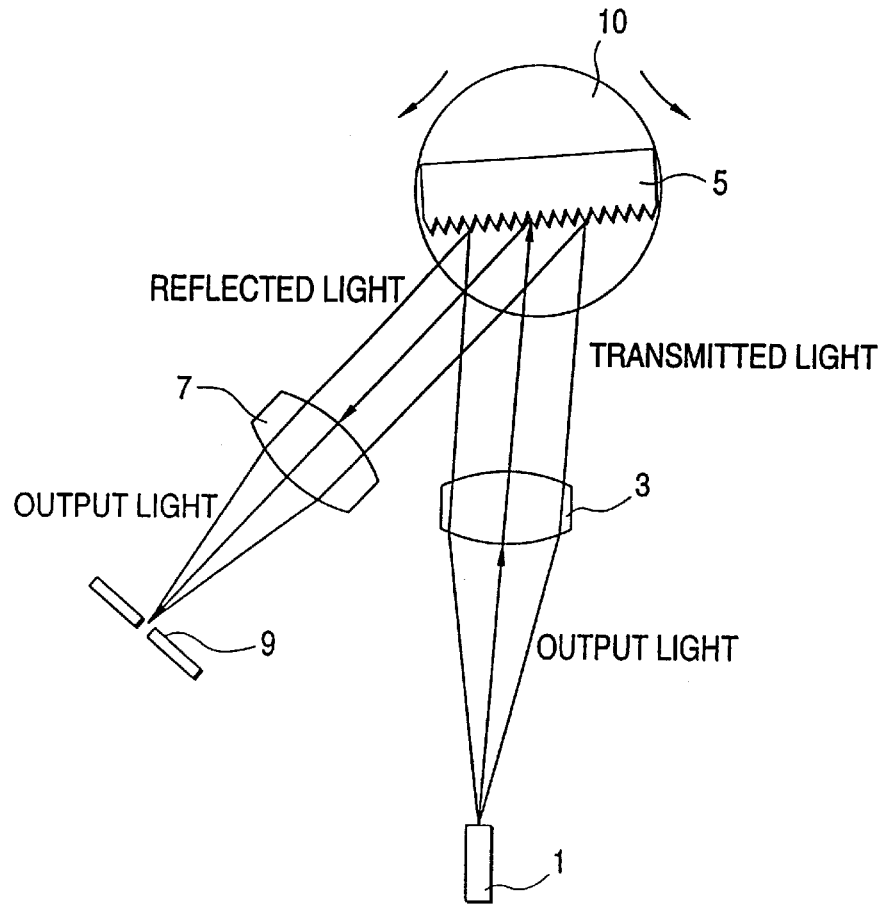
FIG. 1 is a schematic diagram illustrating a monochromator according to an embodiment of the present invention.
Figure 2:
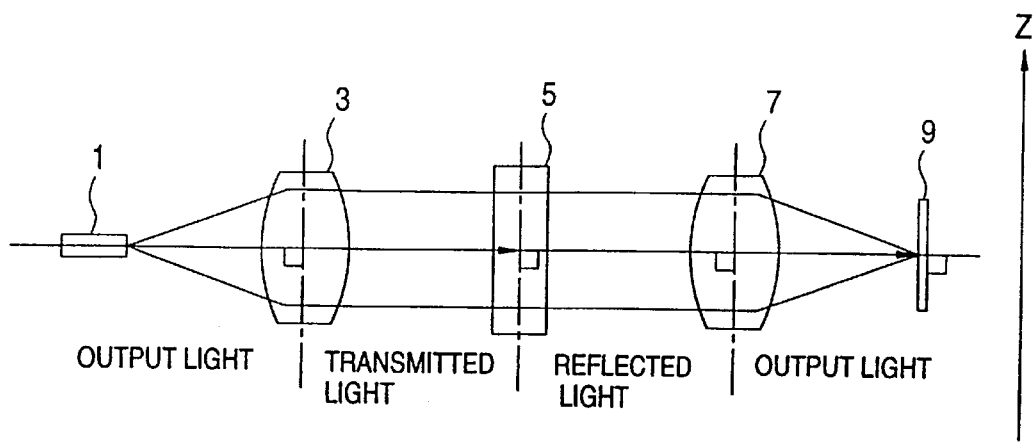
FIG. 2 is an explanatory diagram in which the structure of the monochromator is developed along the optical path.

FIG. 1 is a schematic diagram illustrating a monochromator according to the embodiment, and FIG. 2 is an explanatory diagram in which the structure of the monochromator is developed along the optical path (the z-axis indicates the height direction).

As shown in FIG. 1, the monochromator of this embodiment includes an optical fiber (input portion) 1 for propagating the light to be measured and outputting it to the space from its emitting end; a first lens (first optical system) 3 for converting the output light from the optical fiber 1 into parallel rays of light; a reflection-type diffraction grating (spectral diffraction means) 5 for allowing the light transmitted through the first lens 3 to be reflected at an angle which differs depending on the wavelength; a second lens (second optical system) 7 for condensing the reflected light from the diffraction grating 5; an output slit (output portion) 9 disposed at a specific focusing position of the second lens 7 and for allowing only a particular range (the light incident in parallel to the center line of the second lens 7) of the output light from the second lens 7; and a rotating means (angle changing means) 10 for rotating the diffraction grating 5 about a rotational axis parallel with the grooves scored on the surface of the diffraction grating 5 to thereby sweep the wavelength of the light to be measured which is transmitted through the output slit 9.

As shown in FIG. 2, the center line of the light emitted from the optical fiber 1 and the center line of the first lens 3 are on the same straight line which perpendicularly intersects the rotational axis of the diffraction grating 5. For the sake of convenience of description, this straight line will be referred to as a straight line concerning the incident light. Similarly, the center line of the second lens 7 and the center line of the output light transmitted through the output slit 9 are on the same straight line which perpendicularly intersects the rotational axis of the diffraction grating 5. This straight line will be referred to as a straight line concerning the output light. The straight line concerning the incident light and the straight line concerning the output light are not on the same straight line, but are in the same plane which is perpendicular to the reflecting surface of the diffraction grating 5.

Figure 3:
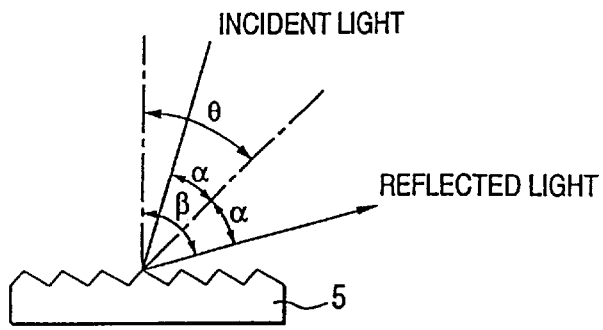
FIG. 3 is an explanatory diagram illustrating the incident light upon a diffraction grating and the reflected light extracted therefrom in the monochromator.

FIG. 3 is an explanatory diagram illustrating the relationship between the incident light upon the diffraction grating 5 and the reflected light extracted therefrom.

As shown in the drawing, as for the angle $\beta$ formed by the reflected light from the diffraction grating 5 transmitted through the output slit 9 and the normal to the diffraction grating 5, a greater angle than the angle $\theta$ of rotation of the diffraction grating 5 can be obtained. Here, the angle $\theta$ of rotation refers to the angle which is formed by, on one hand, a bisector of the incident optical axis and the reflective optical axis of the diffraction grating and, on the other hand, the normal to the diffraction grating, and is a predetermined angle according to the wavelength.

As the diffraction grating 5 is rotated by the rotating means 10, the aforementioned angle $\beta$ and the angle $\theta$ of rotation assume different values, but the angle $\beta$ is greater than the angle $\theta$ of rotation in a major portion of the range of its rotation.

As the first and second lenses 3 and 7, it is preferable to use achromatic lenses which minimize chromatic aberration over a wide wavelength range. By so doing, it is possible to realize a monochromator which has a high resolving power over the wide wavelength range, a wide dynamic range, and stable characteristics. This type of lens is considered to be suitable when coping with the following trouble: Namely, this is the trouble that since chromatic aberration is usually present in a lens, and the focal length differs depending on the wavelength of the light incident upon the lens, even if the focal length is adjusted by making the light of a certain wavelength incident upon the lens, when the light of another wavelength is made incident upon the lens, the focus on the output slit becomes blurred, thereby making it impossible to obtain a high resolving power.

The monochromator of this embodiment is constructed as described above, and the light to be measured which is emitted from the optical fiber 1 is converted into parallel rays of light by the first lens 3 and projected onto the diffraction grating 5, and of the light reflected by the diffraction grating 5, the light reflected at a predetermined angle, i.e., the light of a predetermined wavelength, is condensed by the second lens 7 and is outputted from the output slit 9. Accordingly, a spectrum corresponding to the angle of the diffraction grating 5 is spectrally separated from the light to be measured and is outputted. Further, if the diffraction grating 5 is rotated by the rotating means 10, a spectrum of a different value is outputted.

Further, the resolving power RB in the monochromator having the above-described construction can be approximately expressed by the following formula:

$$RB = 2d/(m \cdot f) \cdot S \cdot \cos \beta \qquad (1)$$

where d is the groove spacing of the diffraction grating 5, m is the order of diffraction of the diffraction grating 5, f is the focal length of the lens, S is the slit width of the output slit 9, and β is the angle formed by the reflected light from the diffraction grating 5 and the normal to the diffraction grating 5.

In the monochromator having the above-described construction, if the groove spacing of the diffraction grating 5 and the focal lengths of the first and second lenses 3 and 7 are optimized without canceling the positional relationship between the first and second lenses 3 and 7, it is possible to obtain a monochromator which has a wide dynamic range of the light to be measured and stable characteristics. Meanwhile, in the light of the demand for making the monochromator compact, it is desirable to make the focal lengths of the first and second lenses 3 and 7 short. However, if the focal lengths are made short, the resolving power deteriorates as is apparent from the formula (1) and therefore, the focal lengths may be selected appropriately in accordance with the purpose of measurement and the condition of use.

Figure 4:
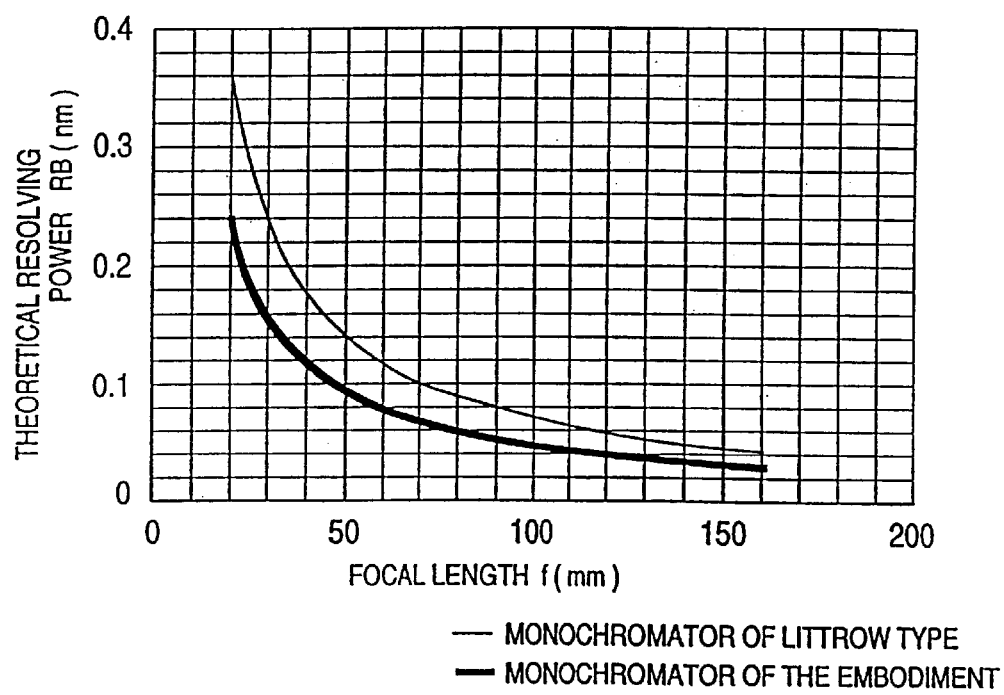
FIG. 4 is a graph illustrating the difference in resolving power between the monochromator of the embodiment and a conventional monochromator of Littrow type.
Figure 7:
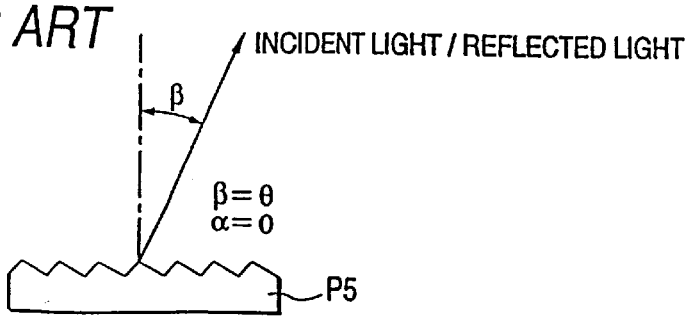
FIG. 7 is an explanatory diagram illustrating the incident light upon a diffraction grating and the reflected light extracted therefrom in the conventional monochromator.
Figure 5:
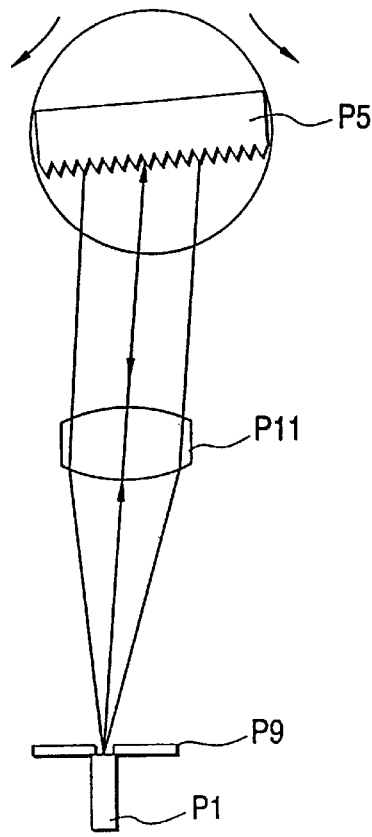
FIG. 5 is a schematic diagram illustrating an example of a conventional monochromator.
Figure 6:
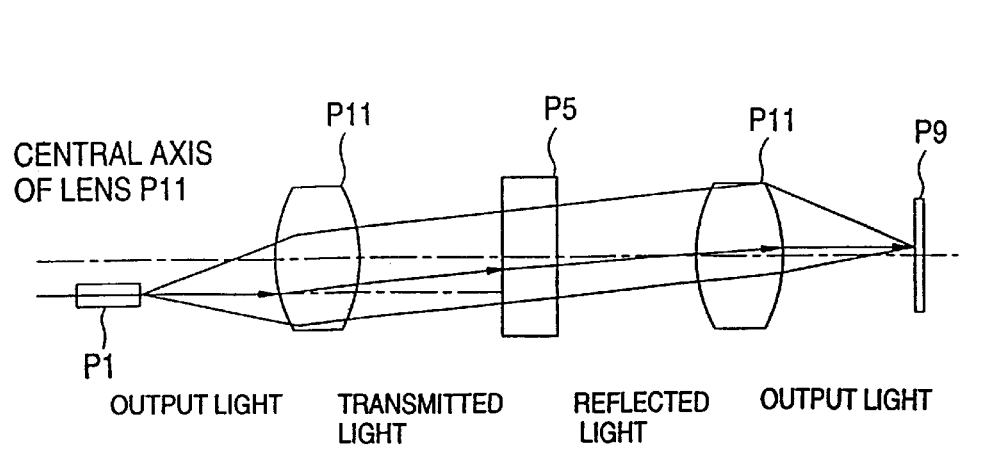
FIG. 6 is an explanatory diagram in which the structure of the conventional monochromator is developed along the optical path.

FIG. 4 is a graph in which a comparison is made in resolving power between the monochromator having the above-described construction and the conventional monochromator of Littrow type.

This graph shows the theoretical resolving power of the entire monochromator with respect to the focal length of each lens (the focal length of each of the first and second lenses 3 and 7 and the lenses used in the conventional monochromator of Littrow type) concerning the monochromator having the above-described construction and the conventional monochromator of Littrow type. As for the respective diffraction gratings, a description is given of a case where a diffraction grating having a groove spacing of 1,100 lines/mm is used.

As is apparent from the graph, the monochromator of this embodiment is able to obtain a higher resolving power with lenses of a shorter focal length than the conventional monochromator of Littrow type.

As described above, according to the monochromator of this embodiment, the conversion of the light into parallel rays of light and the condensing of light by using the first and second lenses 3 and 7 make it possible to increase the dynamic range of the light to be measured. In addition, since the optical path from the optical fiber 1 to the diffraction grating 5 and the optical path from the diffraction grating 5 to the output slit 9 are independent from each other, the first lens 3 and the second lens 7 can be respectively set in ideal arrangement and orientation.

Further, since the center lines of the first lens 3 and the second lens 7 are arranged and set so as to be located on the same line as the center line of the optical path, it is possible to minimize the aberration due to the lens occurred when the lens is used in the conventional monochromator of Littrow type, and it is possible to avoid the decline in resolving power as practically as possible.

Since the arrangement provided is such that the center line of the optical path of the light projected from the first lens 3 onto the diffraction grating 5 and the center line of the optical path (the optical path of the spectrum which is extracted) of the light reflected from the diffraction grating 5 to the second lens 7 are on the same plane perpendicular to the grooves of the diffraction grating 5 and on different straight lines, the spectral separation of the light to be measured by the diffraction grating 5 can be effected efficiently and with high accuracy. Accordingly, it is possible to increase the dynamic range of the light to be measured.

As for the angle β formed by the reflected light from the diffraction grating 5 and the normal to the diffraction grating 5, since a greater angle than the angle θ of rotation of the diffraction grating 5 can be obtained as described above, the resolving power concerning the diffraction grating can be enhanced, so that it is possible to increase the solving power of the monochromator as a whole.

It should be noted that the present invention is not limited to the monochromator of this embodiment. For example, mirror systems instead of the lenses may be used for the first and second optical systems. By so doing, it is possible to avoid the problem due to the chromatic aberration. Further, the spectral diffraction means is not limited to the reflection-type diffraction grating, and it is possible to use a transmission-type diffraction grating or a prism. Furthermore, the arrangement for changing the angle of incidence upon the spectral diffraction means and the angle of reflection therefrom is not limited to the rotation on the spectral diffraction means side, and it is possible to use movement of the arrangement (rotating movement centering around the spectral diffraction means) on the incident or output side of the light to be measured. In addition, specifically illustrated detailed arrangements, such as the optical fiber serving as the input portion and the output slit serving as the output portion, may be modified appropriately without departing from the gist of the present invention.

As described above, according to the present invention, the conversion of the light into parallel rays of light by the first optical system and the condensing of the light by the second optical system make it possible to increase the dynamic range of the light to be measured. At the same time, the optical path of the light incident upon the spectral diffraction means and the optical path of a spectrum outputted and extracted from the spectral diffraction means are arranged independently, and the first and second optical systems are independently provided for the respective optical paths. Accordingly, the first and second optical systems can be set in ideal arrangement and orientation, and it is possible to realize a monochromator having a high resolving power and stable characteristics by minimizing the aberrations of the first and second optical systems.

Furthermore, since the optical path of the light incident upon the spectral diffraction means and the optical path of the spectrum outputted and extracted from the spectral diffraction means are oriented in different directions, the angle formed by the reflected light from the diffraction grating and the normal to the diffraction grating can be made greater than the angle of rotation of the diffraction grating, thereby making it possible to realize a monochromator having a high resolving power.

What is claimed is:

1. A monochromator comprising:
    an incident portion upon which light to be measured is made incident;
    a first optical system for converting the incident light to be measured into parallel rays of light;
    spectral diffraction means for receiving the light to be measured converted into the parallel rays of light and for outputting the light at an angle which differs depending on wavelength;

a second optical system for condensing the output light outputted from said spectral diffraction means at a certain angle;

an output portion for outputting the output light thus condensed;

angle changing means for making variable at least a relative angle between said spectral diffraction means and said second optical system by one of rotation of said spectral diffraction means;

wherein said spectral diffraction means is a reflection-type diffraction grating, and a maximum angle formed by the light reflected from said diffraction grating and condensed by said second optical system and a normal to said diffraction grating is greater than an angle of rotation of said diffraction grating with respect to the reflected light which is condensed; and wherein a center line of an optical path of the light incident from said incident portion is on the same straight line as a center line of said first optical system, and a center line of an optical path of the light reflected from said spectral diffraction means and condensed by said second optical system is on the same straight line as a center line of said second optical system.

2. A monochromator comprising:

an incident portion upon which light to be measured is made incident;

a first optical system for converting the incident light to be measured into parallel rays of light;

spectral diffraction means for receiving the light to be measured converted into the parallel rays of light and for outputting the light at an angle which differs depending on wavelength;

a second optical system for condensing the output light outputted from said spectral diffraction means at a certain angle;

an output portion for outputting the output light thus condensed; and rotating means for rotating said spectral diffraction means so as to change the wavelength of the output light outputted from said output portion;

wherein said spectral diffraction means is a reflection-type diffraction grating, and a maximum angle formed by the light reflected from said diffraction grating and condensed by said second optical system and a normal to said diffraction grating is greater than an angle of rotation of said diffraction grating with respect to the reflected light which is condensed; and wherein a center line of an optical path of the light incident from said incident portion is on the same straight line as a center line of said first optical system, and a center line of an optical path of the light reflected from said spectral diffraction means and condensed by said second optical system is on the same straight line as a centerline of said second optical system.

3. The monochromator according to claim 2, wherein said spectral diffraction means is a diffraction grating, and said rotating means rotates said diffraction grating about a rotational axis thereof parallel to grooves of said diffraction grating, and wherein a center line of an optical path of the light projected from said incident portion onto said diffraction grating through said first optical system and a center line of an optical path of the light emitted from said diffraction grating and condensed at said output portion through said second optical system are in an identical plane perpendicular to the rotational axis of said diffraction grating and are on different straight lines.

4. The monochromator comprising:

an incident portion upon which light to be measured is made incident;

a first optical system for converting the incident light to be measured into parallel rays of light;

spectral diffraction means for receiving the light to be measured converted into the parallel rays of light and for outputting the light at an angle which differs depending on wavelength;

a second optical system for condensing the output light outputted from said spectral diffraction means at a certain angle;

an output portion for outputting the output light thus condensed;

rotating means for rotating said spectral diffraction means so as to change the wavelength of the output light outputted from said output portion; and wherein said spectral diffraction means is a reflection-type diffraction grating, and a maximum angle formed by the light reflected from said diffraction grating and condensed by said second optical system and a normal to said diffraction grating is greater than an angle of rotation of said diffraction grating with respect to the reflected light which is condensed, and wherein said rotating means rotates said diffraction grating about a rotational axis thereof parallel to grooves of said diffraction grating, and wherein a center line of an optical path of the light projected from said incident portion onto said diffraction grating through said first optical system and a center line of an optical path of the light emitted from said diffraction grating and condensed at said output portion through said second optical system are in an identical plane perpendicular to the rotational axis of said diffraction grating and are on different straight lines.

* * * * *